(12) United States Patent
Kim et al.

(10) Patent No.: US 12,341,208 B2
(45) Date of Patent: Jun. 24, 2025

(54) BATTERY MODULE, BATTERY RACK, AND POWER STORAGE DEVICE

(71) Applicant: LG ENERGY SOLUTION, LTD., Seoul (KR)

(72) Inventors: Seung-Joon Kim, Daejeon (KR); Jin-Hak Kong, Daejeon (KR); Ja-Eon Gu, Daejeon (KR); Min-Ho Kwon, Daejeon (KR); Jae-Uk Ryu, Daejeon (KR); Jeong Bin Yu, Daejeon (KR); Young-Bum Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 201 days.

(21) Appl. No.: 17/773,264

(22) PCT Filed: Aug. 20, 2020

(86) PCT No.: PCT/KR2020/011133
§ 371 (c)(1),
(2) Date: Apr. 29, 2022

(87) PCT Pub. No.: WO2021/091058
PCT Pub. Date: May 14, 2021

(65) Prior Publication Data
US 2024/0154229 A1    May 9, 2024

(30) Foreign Application Priority Data

Nov. 7, 2019 (KR) .......................... 10-2019-0141715

(51) Int. Cl.
*H01M 50/24* (2021.01)
*H01M 10/613* (2014.01)
(Continued)

(52) U.S. Cl.
CPC ......... *H01M 50/24* (2021.01); *H01M 10/613* (2015.04); *H01M 10/6557* (2015.04);
(Continued)

(58) Field of Classification Search
CPC ............... H01M 50/24; H01M 10/613; H01M 10/6557; H01M 50/211; H01M 50/3425;
(Continued)

(56) References Cited

U.S. PATENT DOCUMENTS 6,278,259 B1    8/2001    Kimoto et al.
8,507,121 B2 *  8/2013    Saito .................... H01M 10/647
                                                    429/96
(Continued)

FOREIGN PATENT DOCUMENTS

CN    107342441 A    11/2017
EP    1091431 A2    4/2001
(Continued)

OTHER PUBLICATIONS

Translation of JP2015076216A (Year: 2015).*
(Continued)

*Primary Examiner* — Nicholas A Smith
*Assistant Examiner* — Seamus Patrick McNulty
(74) *Attorney, Agent, or Firm* — Birch, Stewart, Kolasch & Birch, LLP

(57) ABSTRACT

A battery module includes a plurality of cell assemblies including a plurality of secondary batteries; a module housing including an accommodation space configured to accommodate the plurality of cell assemblies; and a blocking member configured to, when a gas pressure more than a predetermined gas pressure or a heat more than a predetermined temperature is generated in at least some cell assem-
(Continued)

blies among the plurality of cell assemblies, block the generated gas or heat from moving to the other cell assemblies.

9 Claims, 11 Drawing Sheets

(51) Int. Cl.
  *H01M 10/6557* (2014.01)
  *H01M 50/211* (2021.01)
  *H01M 50/342* (2021.01)
  *H01M 50/375* (2021.01)
(52) U.S. Cl.
  CPC ..... *H01M 50/211* (2021.01); *H01M 50/3425* (2021.01); *H01M 50/375* (2021.01)
(58) Field of Classification Search
  CPC . H01M 50/375; H01M 10/6556; H01M 50/30
  See application file for complete search history.

(56) References Cited

U.S. PATENT DOCUMENTS

| | | | |
|---|---|---|---|
| 11,870,094 B2* | 1/2024 | Shin | H01M 50/507 |
| 2013/0095355 A1 | 4/2013 | Okutani et al. | |
| 2015/0303418 A1 | 10/2015 | Tanaka et al. | |
| 2016/0020447 A1* | 1/2016 | Janarthanam | H01M 10/625 |
| | | | 180/68.5 |
| 2016/0254578 A1 | 9/2016 | Liu et al. | |
| 2018/0048036 A1 | 2/2018 | Melack et al. | |
| 2019/0044326 A1 | 2/2019 | Williams et al. | |
| 2019/0140235 A1 | 5/2019 | Lindstrom et al. | |

FOREIGN PATENT DOCUMENTS

| | | | |
|---|---|---|---|
| JP | 2001-110377 A | | 4/2001 |
| JP | 4543464 B2 | | 9/2010 |
| JP | 2011-258426 A | | 12/2011 |
| JP | 5078298 B2 | | 11/2012 |
| JP | 2013-69471 A | | 4/2013 |
| JP | 2013-246920 A | | 12/2013 |
| JP | 2014-107178 A | | 6/2014 |
| JP | 2015-76216 A | | 4/2015 |
| JP | 2016-201333 A | | 12/2016 |
| JP | 2017-157438 A | | 9/2017 |
| JP | 2018-98074 A | | 6/2018 |
| JP | 6469243 B2 | | 2/2019 |
| JP | 2019-106307 A | | 6/2019 |
| KR | 10-1147791 B1 | | 5/2012 |
| KR | 10-2013-0088042 A | | 8/2013 |
| KR | 10-1312102 B1 | | 9/2013 |
| KR | 10-1918022 B1 | | 11/2018 |
| KR | 10-2019-0022485 A | | 3/2019 |
| KR | 20190124483 A | * | 11/2019 |
| WO | WO 2014/103038 A1 | | 7/2014 |

OTHER PUBLICATIONS

Translation of KR20190124483A (Year: 2019).*
Extended European Search Report issued in 20884751.7, dated Oct. 5, 2022.
International Search Report (PCT/ISA/210) issued in PCT/KR2020/011133, dated Nov. 24, 2020.

* cited by examiner

BATTERY MODULE, BATTERY RACK, AND POWER STORAGE DEVICE

TECHNICAL FIELD

The present disclosure relates to a battery module, and more particularly, to a battery module that reduces the risk of secondary ignition or explosion.

The present application claims priority to Korean Patent Application No. 10-2019-0141715 filed on Nov. 7, 2019 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

Such a lithium secondary battery mainly uses lithium-based oxides and carbon materials as positive electrode active material and negative electrode active materials, respectively. The lithium secondary battery may include an electrode assembly in which a positive electrode plate and a negative electrode plate coated with a positive electrode active material and a negative electrode active material respectively are arranged with a separator interposed therebetween, and a sheath material, that is, a battery pouch sheath material, that seals and accommodates the assembly together with an electrolyte solution.

Recently, secondary batteries are widely used not only in small devices such as portable electronic devices but also in medium and large devices such as vehicles and energy storage systems. When secondary batteries are used in such medium and large devices, a large number of secondary batteries are electrically connected in order to increase capacity and output power. In particular, pouch type secondary batteries are widely used in such medium and large devices because of advantages such as easy lamination.

Meanwhile, recently, as a need for a large-capacity structure has been increased, including utilization as an energy storage source, a demand for a plurality of secondary batteries electrically connected in series and/or in parallel, a battery module including the plurality of secondary batteries, and a battery rack including a battery management system (BMS) has increased.

In addition, such a battery rack generally may include a rack case made of a metal material to protect or store the plurality of secondary batteries from external impacts. Meanwhile, the demand for high-capacity battery racks is increasing.

However, the battery rack of the prior art may include a plurality of battery modules. When a secondary battery included in such a battery module is thermally runaway and ignites or explodes, high heat gas or flame is transmitted to the adjacent secondary battery, which causes occurrence of a secondary explosion or the like, and thus efforts to prevent secondary ignition or explosion increase.

DISCLOSURE

Technical Problem

The present disclosure is designed to solve the problems of the related art, and therefore the present disclosure is directed to providing a battery module that reduces the risk of secondary ignition or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including a plurality of cell assemblies; a module housing including an accommodation space configured to accommodate the plurality of cell assemblies; and a blocking member configured to, when a gas pressure more than a predetermined gas pressure or a heat more than a predetermined temperature is generated in at least some cell assemblies among the plurality of cell assemblies, block the generated gas or heat from moving to other cell assemblies among the plurality of cell assemblies.

The module housing may include a refrigerant passage configured to make a refrigerant introduced from an outside move in the accommodation space.

The blocking member may include a partition wall portion positioned in the refrigerant passage and including an opening to make the refrigerant pass through; and an opening and closing portion configured to move by the gas pressure more than the predetermined gas pressure or the heat more than the predetermined temperature so as to block at least a part of the opening.

The opening and closing portion may include an extension structure located in the opening and extending in a first direction to be movable in the first direction; and a stopper structure formed on each end of the extension structure and configured to block at least a part of the opening when moving in the first direction.

At least a part of an edge of stopper structure may be bent in the first direction.

A first part of the partition wall portion may be interposed between the plurality of cell assemblies, and a second part may protrude beyond the plurality of cell assemblies.

At least a part of the opening and closing portion may be configured to seal the opening by expanding in volume at more than the predetermined temperature.

The opening and closing portion may be inserted into and positioned in the opening and has a ring shape with a perforated center.

The opening and closing portion may include a mesh structure configured to expand in volume at more than the predetermined temperature such that a mesh hole is sealed.

A part of an outer wall of the module housing may include a vent configured to be opened by melting when an internal temperature rises to more than a second predetermined temperature.

The vent may include a heat transfer fin configured to heat the vent.

In another aspect of the present disclosure, there is provided a battery pack including the at least one battery module and a rack case accommodating the battery module.

In another aspect of the present disclosure, there is provided an energy storage device including at least two battery racks.

Advantageous Effects

According to an aspect of the present disclosure, when a gas pressure more than a predetermined gas pressure or a heat more than a predetermined temperature is generated in at least some of a plurality of cell assemblies, the battery module of the present disclosure may include a blocking member configured to block the generated gas or heat from moving to the other cell assemblies, thereby effectively preventing fire or thermal runaway from spreading to the other cell assemblies. Accordingly, it is possible to increase the safety of the battery module.

In addition, according to an aspect of the present disclosure, the blocking member may include a partition wall portion having at least a part located in a refrigerant passage and including an opening perforated to make a refrigerant pass therethrough, and an opening and closing portion configured to move by a gas pressure more than a predetermined gas pressure to block at least a part of the opening, thereby blocking the generated gas or heat from moving to the other cell assemblies. Accordingly, it is possible to effectively prevent fire or thermal runaway from spreading to the other cell assemblies of the battery module. Accordingly, it is possible to increase the safety of the battery module.

Moreover, according to an aspect of another embodiment of the present disclosure, the blocking member of the battery module of the present disclosure includes a stopper structure having a shape in which at least a part of an edge thereof is bent in a direction in which the opening is located, and thus the opening and closing portion may more smoothly move between the openings, and thus it is possible to more stably prevent fire or thermal runaway from spreading to the other cell assemblies through the blocking member. Accordingly, it is possible to increase the safety of the battery module.

Further, according to an aspect of the present disclosure, the blocking member of the battery module of the present disclosure is configured that at least a part of the opening and closing portion causes volume expansion more than at a predetermined temperature to seal the opening, thereby blocking the generated high heat gas or heat from moving to the other cell assemblies. Accordingly, it is possible to effectively prevent fire or thermal runaway from spreading to the other cell assemblies of the battery module. Accordingly, it is possible to increase the safety of the battery module.

In addition, according to an aspect of the present disclosure, the battery module of the present disclosure may include a vent portion configured to be opened by melting at least a part of a body on a part of an outer wall of a module housing when the internal temperature rises to more than a predetermined temperature, such that when high heat gas flowing through the refrigerant passage is blocked by the blocking member, the high heat gas stagnated by the blocking member may be discharged through the vent portion, thereby minimizing heat from spreading to the other cell assemblies, and discharging high heat gas in an intended direction, and thus safer handling is possible.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
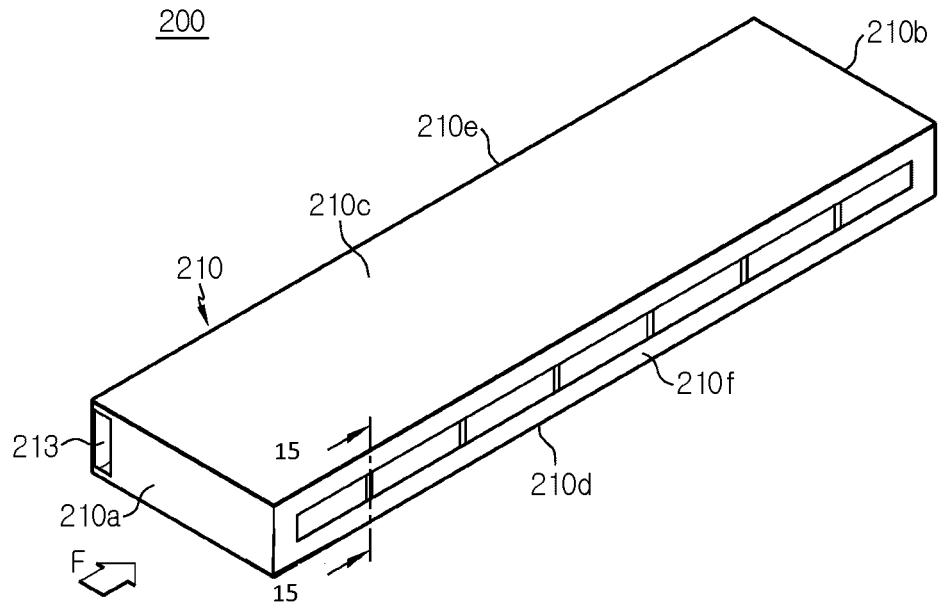
FIG. 1 is a perspective view schematically showing a battery module according to an embodiment of the present disclosure.
Figure 2:
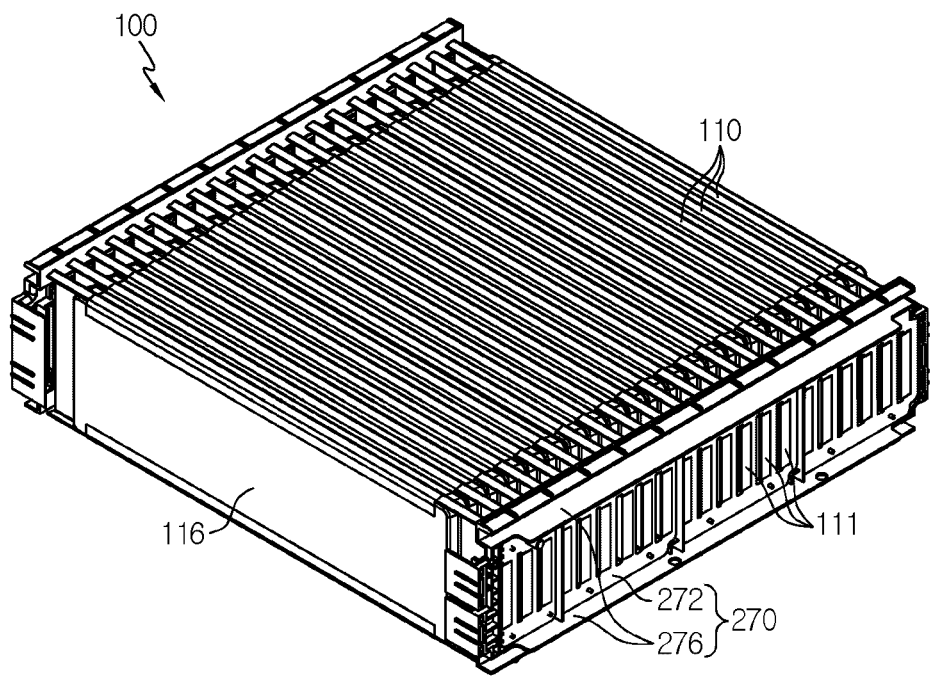
FIG. 2 is a perspective view schematically showing a cell assembly, which is a partial configuration of the battery module according to an embodiment of the present disclosure.
Figure 3:
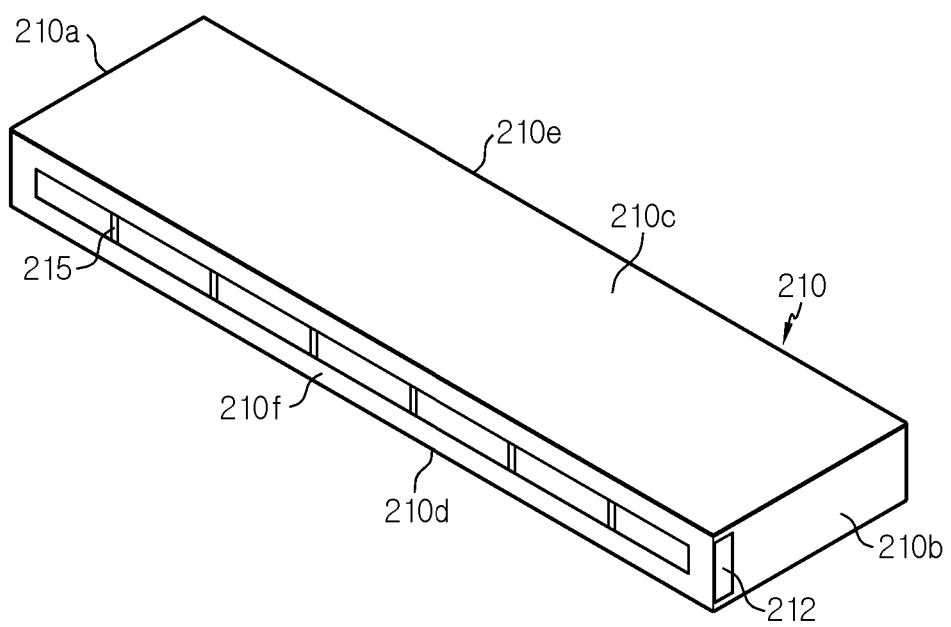
FIG. 3 is a rear perspective view schematically showing a battery module according to an embodiment of the present disclosure.
Figure 4:
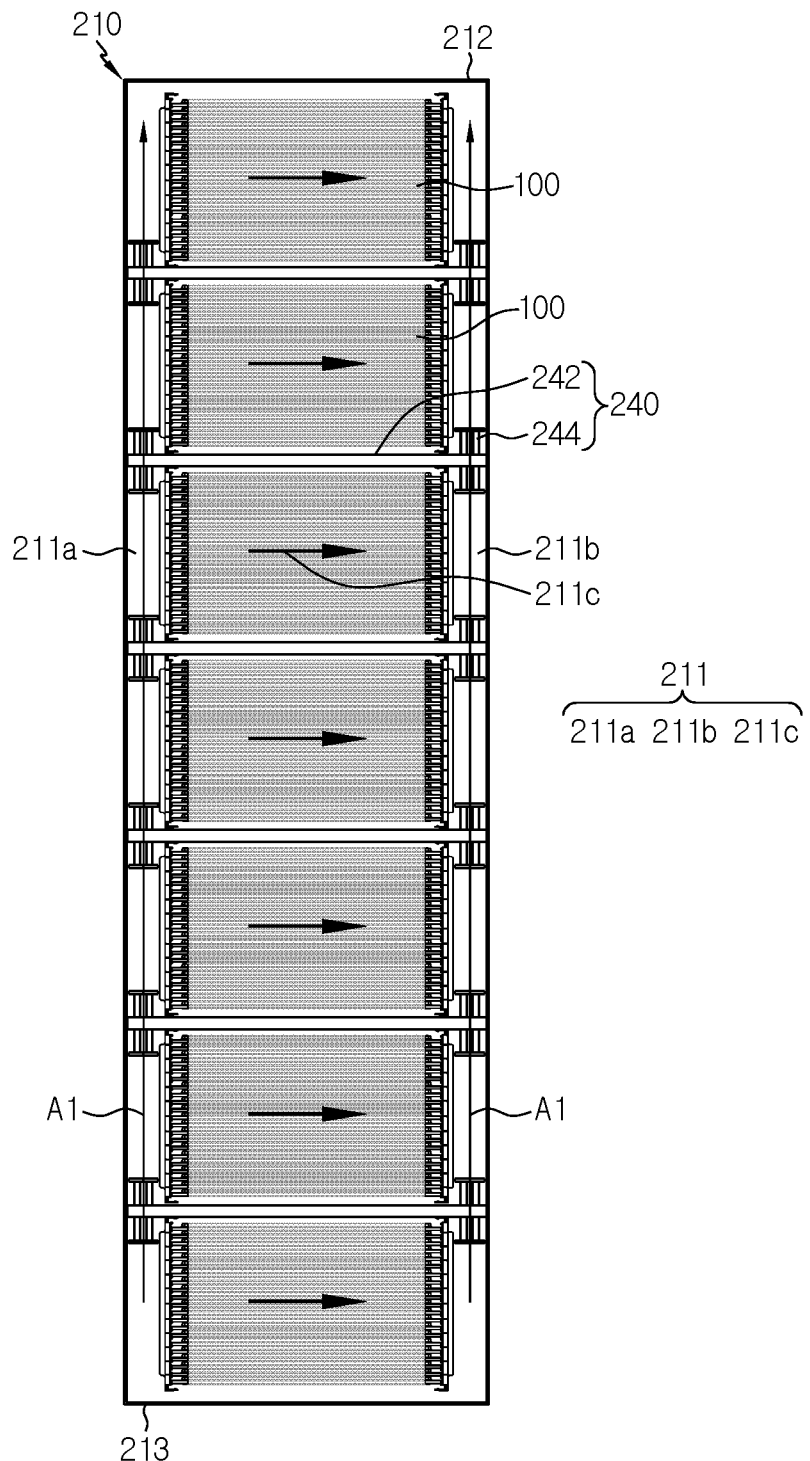
FIG. 4 is a horizontal cross-sectional view schematically showing internal components of the battery module according to an embodiment of the present disclosure.

FIG. 1 is a perspective view schematically showing a battery module according to an embodiment of the present disclosure. FIG. 2 is a perspective view schematically showing a cell assembly, which is a partial configuration of the battery module according to an embodiment of the present disclosure. FIG. 3 is a rear perspective view schematically showing a battery module according to an embodiment of the present disclosure. FIG. 4 is a horizontal cross-sectional view schematically showing internal components of the battery module according to an embodiment of the present disclosure. In FIG. 4, an upper wall of a module housing 210 is removed so that the internal components of a battery module 200 may be viewed.

Referring to FIGS. 1 to 4, the battery module 200 according to an embodiment of the present disclosure may include a plurality of cell assemblies 100, the module housing 210 accommodating the plurality of cell assemblies 100, and a blocking member 240.

First, the cell assembly 100 may include a plurality of secondary batteries 110 arranged in one direction.

The secondary battery 110 may be a pouch-type secondary battery 110. For example, as shown in FIG. 4, when viewed in a F direction (from the front), the cell assembly 100 may be configured in a form in which a plurality of pouch-type secondary batteries 110 are stacked to each other side by side in front and rear directions. For example, as shown in FIG. 4, one cell assembly 100 may include 21 pouch-type secondary batteries 110.

Meanwhile, in the present specification, unless otherwise specified, up, down, front, back, left and right direction are based on when viewed in the F direction In particular, such a pouch-type secondary battery 110 may include an electrode assembly (not shown), an electrolyte (not shown), and a pouch 116.

Furthermore, a positive electrode lead 111 and a negative electrode lead (not shown) may be formed on ends in the left and right direction opposite to each other with respect to the center of the secondary battery 110. That is, the positive electrode lead 111 may be provided on one end (a right end) with respect to the center of the secondary battery 110. In addition, the negative electrode lead may be provided on the other end (a left end) of the secondary battery 110 with respect to the center of the secondary battery 110.

However, the battery module 200 according to the present disclosure is not limited to the pouch-type secondary battery 110 described above, and various secondary batteries 110 known at the time of filing of the present disclosure may be employed.

Meanwhile, referring again to FIGS. 1 and 2, the battery module 200 may further include a bus bar assembly 270. Specifically, the bus bar assembly 270 may include at least one bus bar 272 configured to electrically interconnect the plurality of secondary batteries 110 and at least two busbar frames 276 configured to mount the at least one bus bar 272 onto the outside. When viewed in the F direction of FIG. 3, the at least two busbar frames 276 may be respectively provided on both sides of the cell assembly 100 in the left and right direction.

Meanwhile, in the present specification, unless otherwise specified, up, down, front, back, left and right direction are based on when viewed in the F direction Meanwhile, the module housing 210 may include an inner space to accommodate the cell assembly 100 therein. Specifically, when viewed in the F direction of FIG. 1, the module housing 210 may include a front wall 210a, a rear wall 210b, an upper wall 210c, a lower wall 210d, a left wall 210e, and a right wall 210f.

Specifically, the lower wall 210d may have an area larger than the size of a lower surface of the at least two cell assemblies 100 so as to mount the at least two cell assemblies 100 onto an upper portion. The lower wall 210d may have a plate shape extending in a horizontal direction.

Further, referring to FIGS. 2 and 4, the upper wall 210c may have a plate shape extending in the horizontal direction to cover an upper portion of the cell assembly 100. The left wall 210e and right wall 210f may have a plate shape extending in a lower direction from both ends of the upper wall 210c in the left and right direction so as to cover both sides of the cell assembly 100 in the left and right direction.

Moreover, the front wall 210a may be configured to cover the front of the cell assembly 100. For example, the front wall 210a may have a plate of a size larger than that of a front surface of the cell assembly 100. The plate of the front wall 210a may be in the shape of erecting in a vertical direction.

In addition, the rear wall 210b may be configured to cover the rear of the cell assembly 100. For example, the rear wall 210b may have a plate shape of a size larger than that of a rear surface of the cell assembly 100.

Meanwhile, when a gas pressure more than a predetermined gas pressure or a heat more than a predetermined temperature is generated in at least some cell assemblies 100 of the plurality of cell assemblies 100, the blocking member 240 may be configured to block the generated gas or heat from moving to the other cell assemblies 100.

For example, ignition or thermal runaway may occur in some secondary batteries 110 of the cell assembly 100. At this time, an internal component of the secondary battery 110 may be vaporized or gas may be generated to cause high pressure gas and flame. In this regard, the blocking member 240 may be configured to block high pressure gas or high temperature heat generated from some cell assemblies 100 inside the module housing 210 from moving to the other cell assemblies 100.

For example, as shown in FIG. 4, the battery module 200 may include seven blocking members 240 between the plurality of cell assemblies 100.

Accordingly, according to this configuration of the present disclosure, when a gas pressure more than a predetermined gas pressure or a heat more than a predetermined temperature is generated in at least some cell assemblies 100 of the plurality of cell assemblies 100, the blocking member 240 configured to block the generated gas or heat from moving to the other cell assemblies 100 may effectively prevent fire or thermal runaway from spreading to the other cell assemblies 100. Accordingly, it is possible to increase the safety of the battery module 200.

Meanwhile, referring again to FIGS. 1 and 3, the module housing 210 may include an inlet 213 and an outlet 212 through which external air A1 circulates to the module housing 210. The inlet 213 may be configured such that the external air A1 is introduced into the module housing 210. The outlet 212 may be formed in a part of the module housing 210 and configured to discharge the introduced air A1 to the outside.

For example, a blower (not shown) may be provided in the inlet 213. When viewed in the F direction of FIG. 1, the blower may be mounted on a front end of the module housing 210 and configured to allow the external air A1 to be introduced into the module housing 210. The blower may include a blowing fan configured to rotate by receiving power.

Furthermore, the module housing 210 may include a refrigerant passage 211 configured to make a refrigerant introduced from the outside moving in the space. The refrigerant passage 211 may be a space that extends long in the front and rear direction so as to communicate with the outside. The refrigerant passage 211 may be provided on one or both sides of the cell assembly 100 in the left and right direction.

In addition, the refrigerant passage 211 may be a space between the upper portion or the lower portion of the cell assembly 100 and the module housing 210. That is, the external air A1 introduced into the battery module 200 may be discharged through a plurality of outlets 212 formed in the end of the refrigerant passage 211 and perforated to communicate with the outside of the battery module 200 as the refrigerant passes through the upper portion or the lower portion of the cell assembly 100 and moves in the right direction of the cell assembly 100.

In addition, the refrigerant passage 211 may include a supply portion 211a, a discharge portion 211b, and an intermediate portion 211c. Specifically, the supply portion 211a may be located on one side of the cell assembly 100 in the left and right direction. For example, the supply portion 211a may be located on the left side of the cell assembly 100 when viewed in the F direction.

In addition, the discharge portion 211b may be located on the other side of the cell assembly 100 in the left and right direction. For example, when viewed in the F direction, the discharge portion 211b may be located on the right side of the cell assembly 100. The discharge portion 211b may be configured to make the external air A1 introduced into the module housing 210 move to the outlet 212. That is, the discharge portion 211b may be configured to communicate with the outlet 212. The intermediate portion 211c may be configured to make the refrigerant flow to the upper portion or the lower portion of the cell assembly 100 in the left and right direction.

Figure 5:
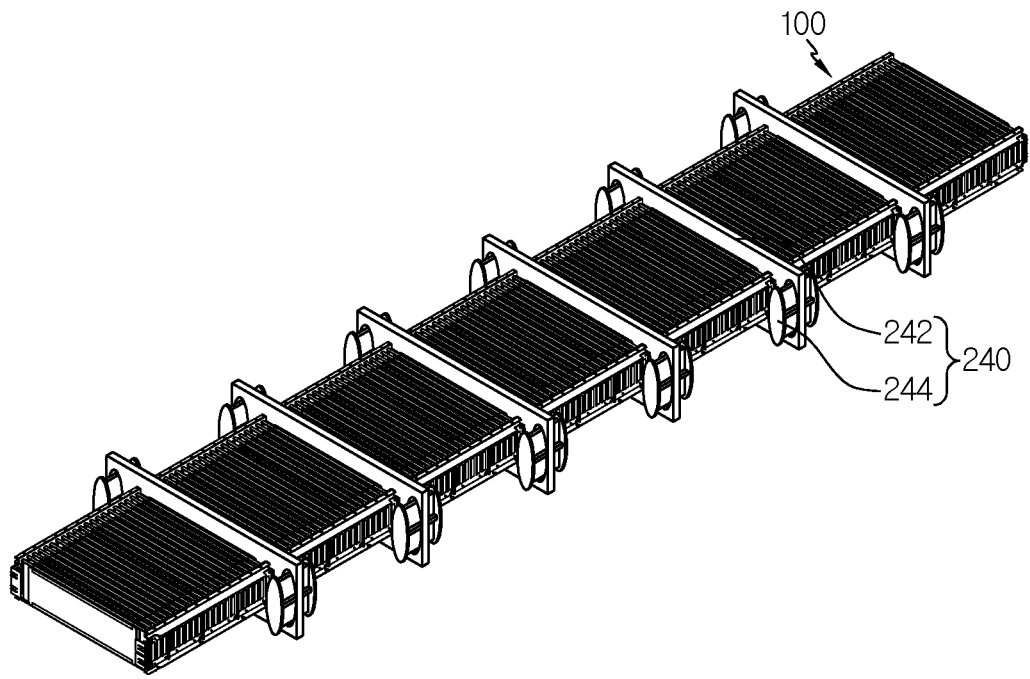
FIG. 5 is a perspective view schematically showing some components of a battery module according to an embodiment of the present disclosure.
Figure 6:
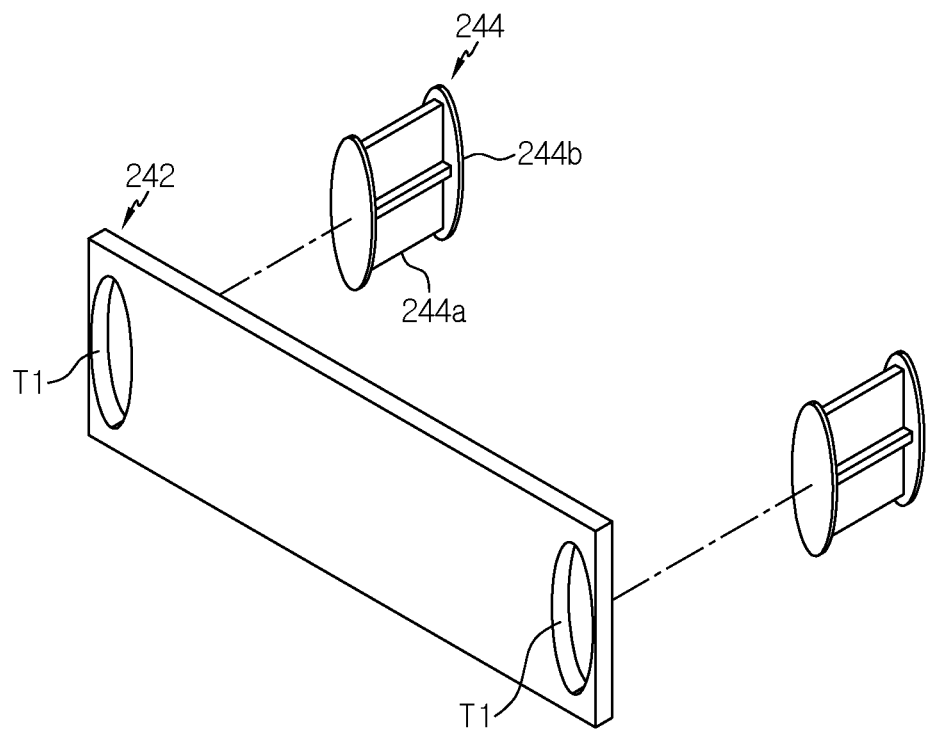
FIG. 6 is an exploded perspective view schematically showing a blocking member, which is a partial configuration of a battery module according to an embodiment of the present disclosure.
Figure 7:
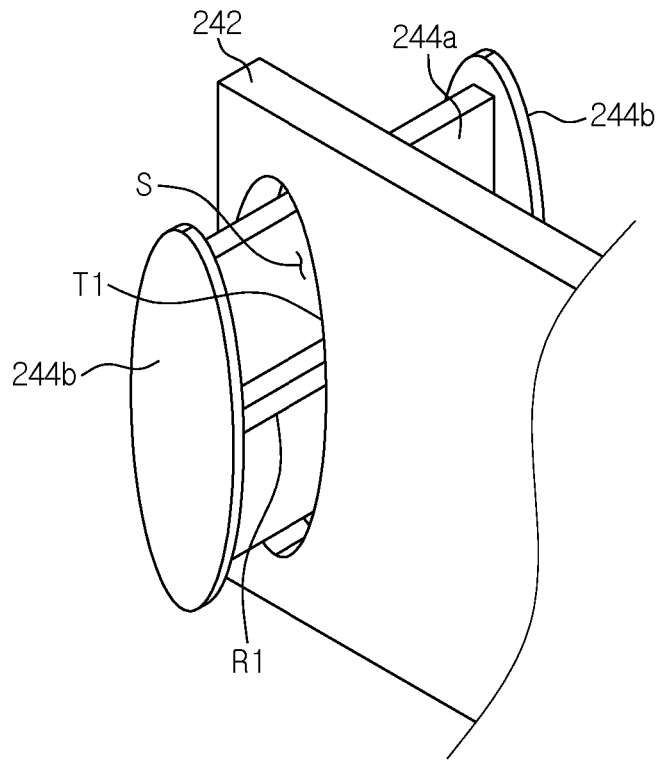
FIGS. 7 and 8 are partial perspective views schematically showing an operation of the blocking member, which is a partial configuration of a battery module according to an embodiment of the present disclosure.
Figure 8:
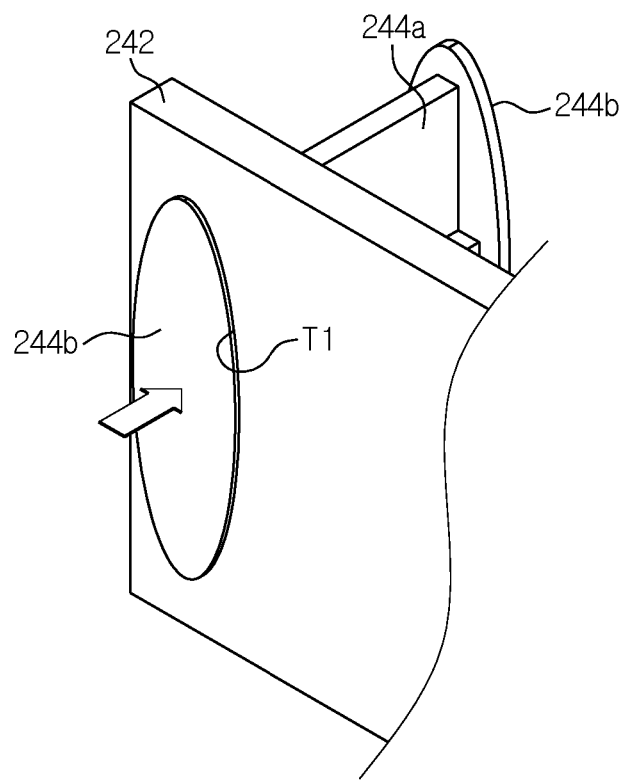

FIG. 5 is a perspective view schematically showing some components of the battery module 200 according to an embodiment of the present disclosure. FIG. 6 is an exploded perspective view schematically showing the blocking member 240, which is a partial configuration of the battery module 200 according to an embodiment of the present disclosure. FIGS. 7 and 8 are partial perspective views schematically showing an operation of the blocking member 240, which is a partial configuration of the battery module 200 according to an embodiment of the present disclosure.

Referring to FIGS. 5 to 8, the blocking member 240 may include a partition wall portion 242 and an opening and closing portion 244. Specifically, at least a part of the partition wall portion 242 may be positioned in the refrigerant passage 211 and an opening T1 perforated to make the air A1 which the refrigerant pass through may be formed in the partition wall portion 242. For example, as shown in FIG. 6, the opening T1 may be formed in each of both ends of one partition wall portion 242 in the left and right direction. The opening T1 may be configured to have the opening and closing portion 244 inserted thereinto.

The opening and closing portion 244 may be configured to move by a gas pressure more than a predetermined gas pressure or a heat more than a predetermined temperature so as to block at least a part of the opening T1. For example, when a predetermined or higher high pressure gas is generated from the cell assembly 100, the opening and closing portion 244 of the blocking member 240 shown in FIGS. 7 and 8 may move to block at least a part of the opening T1 by the gas pressure.

More specifically, the opening and closing portion 244 may include an extension structure 244a and a stopper structure 244b. The extension structure 244a may be positioned within the opening T1 and may extend in both directions so as to be movable in both directions. A cross rib R1 extending so as to be in close contact with an inner surface of the opening T1 may be provided in the extension structure 244a. A space through which the air A1 may circulate may be formed between the opening T1 and the cross rib R1. Therefore, in a situation where no fire has occurred, even if the opening and closing portion 244 is inserted into the opening T1 of the partition wall portion 242, the air A1 that is the refrigerant may circulate through the space between the opening T1 and the cross rib R1.

The stopper structure 244b may be formed on each of extended both ends of the extension structure 244a and may be configured to block at least a part of the opening T1 when moving in a direction in which the opening T1 is located.

For example, as shown in FIG. 5, the opening and closing portion 244 may include the extension structure 244a extending in the front and rear direction so as to be movable in the front and rear direction. In addition, the stopper structure 244b may be formed on each of both ends of the extension structure 244a in the extended direction, that is, in the front and rear direction. The stopper structure 244b may have a plate structure having a plane in a shape corresponding to the opening T1. When a high pressure gas is generated due to fire or thermal runaway of the cell assembly 100, the stopper structure 244b may be configured to seal the opening T1 by the plate structure of the stopper structure 244b as the extension structure 244a moves in one direction along the opening T1.

Accordingly, according to this configuration of the present disclosure, at least a part of the blocking member 240 may include the partition wall portion 242 having at least a part is located in the refrigerant passage 211 and including the opening T1 perforated to make the refrigerant pass therethrough, and the opening and closing portion 244 configured to move by a gas pressure more than a predetermined gas pressure to block at least a part of the opening T1, thereby blocking the generated gas or heat from moving to the other cell assemblies 100. Accordingly, it is possible to effectively prevent fire or thermal runaway from spreading to the to the other cell assemblies 100 of the battery module 200. Accordingly, it is possible to increase the safety of the battery module 200.

Moreover, in a situation where no fire has occurred, a predetermined space S is formed between the extension structure 244a of the opening and closing portion 244 and the opening T1 of the partition wall portion 242 so that the refrigerant (the air A1) may circulate for cooling the plurality of cell assemblies 100, thereby preventing cooling of the plurality of cell assemblies 100 from becoming difficult due to the blocking member 240.

Figure 9:
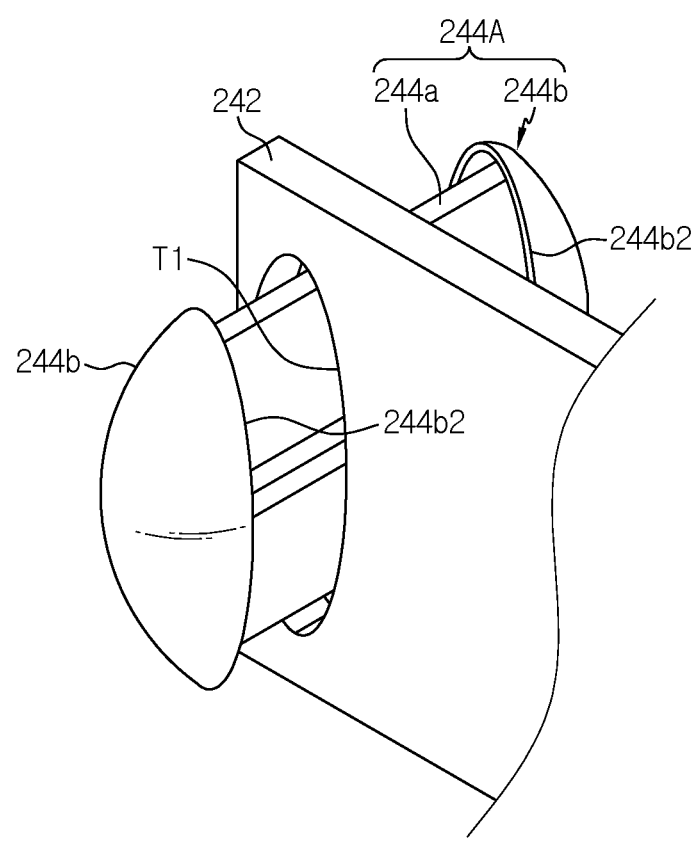
FIG. 9 is a partial perspective view schematically showing a blocking member, which is a partial configuration of a battery module according to another embodiment of the present disclosure.

FIG. 9 is a partial perspective view schematically showing the blocking member 240, which is a partial configuration of the battery module 200 according to another embodiment of the present disclosure.

Referring to FIG. 9 together with FIG. 5, the blocking member 240 according to another embodiment of the present disclosure may be different in the shape of the opening and closing portion 244 of the blocking member 240 of FIG. 7 and may be the same in the other configurations. Specifically, an opening and closing portion 244A of the blocking member 240 of FIG. 9 may have a different shape from that of the stopper structures 244b formed on both ends of the extension structure 244a. The stopper structure 244b may have a shape 244b2 in which at least a part of an edge thereof is bent in a direction in which the opening T1 is located.

For example, as shown in FIG. 9, the stopper structure 244*b* provided on the front end with respect to the extension structure 244*a* may have the shape 244*b*2 in which an edge thereof is bent toward (the rear) the opening T1 of the partition wall portion 242. The stopper structure 244*b* provided on the rear end with respect to the extension structure 244*a* may have a shape 244*b*2 in which an edge thereof is bent in a direction (the front) in which the opening T1 of the partition wall portion 242 is located.

For example, the stopper structure 244*b* may have a hollow hemispherical shape. That is, the stopper structure 244*b* may have a bowl shape. This hollow hemispherical shape may be an appropriate shape capable of effectively receiving the gas pressure when a high pressure gas is generated. That is, a contact area of the gas capable of receiving pressure is larger than that of the plate structure of the stopper structure 244*b* of FIG. 7, and when the stopper structure 244*b* is in contact with the gas, the gas is not easily dispersed, and thus the force applied to the opening and closing portion 244A pushed by the gas pressure may be effectively generated.

Accordingly, according to this configuration of the present disclosure, the stopper structure 244*b* has the shape 244*b*2 in which at least a part of an edge thereof is bent in the direction in which the opening T1 is located, so that the opening and closing portion 244A may move more smoothly between the openings T1. Accordingly, it is possible to more stably prevent fire or thermal runaway from spreading to the other cell assemblies 100 through the blocking member 240. Accordingly, it is possible to increase the safety of the battery module 200.

Referring back to FIGS. 5 and 6, a part of the partition wall portion 242 may be interposed between the plurality of cell assemblies 100. At least a part of the partition wall portion 242 may have a shape that protrudes more than the cell assembly 100. For example, as shown in FIG. 5, seven cell assemblies 100 may be arranged in the front and rear direction, and the partition wall portions 242 may be interposed between the seven cell assemblies 100. The partition wall portion 242 may have a shape of a part interposed between the two cell assemblies 100 and the remaining part of the interposed part that protrudes more than the cell assembly 100 in the vertical and horizontal direction.

For example, the partition wall portion 242 may include a flame retardant material. The flame retardant material may be, for example, mica.

Accordingly, according to this configuration of the present disclosure, a part of the partition wall portion 242 is interposed between the plurality of cell assemblies 100, and at least a part of the remaining part protrudes more than the cell assembly 100, and thus even if fire or thermal runaway occurs in some of the cell assemblies 100 among the plurality of cell assemblies 100, the partition wall portion 242 may prevent flame or high heat from being directly transferred to the other cell assemblies adjacent to the cell assembly 100 in which the fire has occurred. Accordingly, the battery module 200 of the present disclosure may prevent fire or thermal runaway from spreading, thereby greatly improving fire safety.

Figure 10:
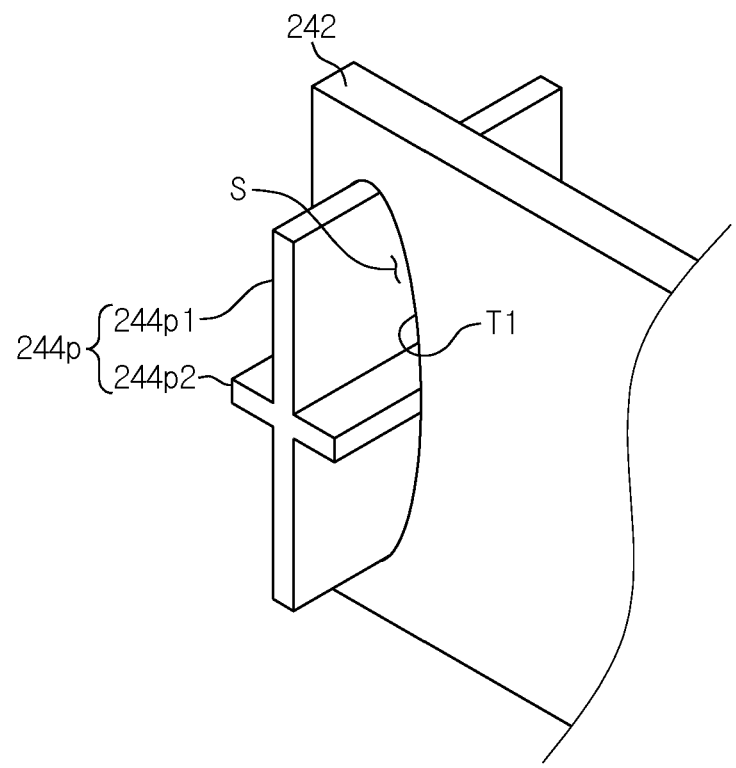
FIGS. 10 and 11 are partial perspective views schematically showing an operation of a blocking member, which is a partial configuration of a battery module according to another embodiment of the present disclosure.
Figure 11:
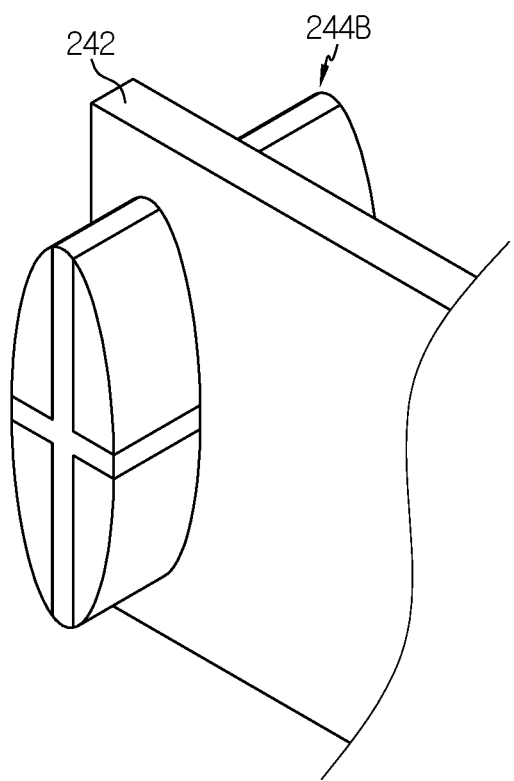

FIGS. 10 and 11 are partial perspective views schematically showing an operation of a blocking member, which is a partial configuration of the battery module according to another embodiment of the present disclosure.

Referring to FIGS. 10 and 11, the opening and closing portion 244B according to another embodiment may be configured to expand a part by a heat more than a predetermined temperature so as to block at least a part of the opening T1. That is, at least a part of the opening and closing portion 244B may be configured to cause volume expansion at more than a predetermined temperature to seal the opening T1. The opening and closing portion 244B may be configured to have a predetermined space with the opening T1 of the partition wall portion 242 so that a refrigerant circulates in a state in which fire or thermal runaway does not occur.

In addition, the opening and closing portion 244B may include a volume expansion material that causes volume expansion at more than a predetermined temperature. For example, the volume expansion material may be Fire Barrier MPP of 3M, Fi-Block of Sekisui, or GRAFGUARD of NeoGraf. The volume expansion material may expand in the volume, for example, from 3 to 40 times or more at 150 to 250 degrees Celsius. At this time, a char layer may be generated. The volume expansion material may include, for example, graphite flakes that are expandable in the volume 100 times or more.

For example, as shown in FIG. 10, the opening and closing portion 244B may have a shape in which a plate 244*p*1 extending in a vertical direction and a plate 244*p*2 extending in a horizontal direction are coupled to each other. That is, the opening and closing portion 244B may have a cross-shaped rib structure 244*p*. The rib structure 244*p* may be configured to be inserted between the openings T1 of the partition wall portion 242. A predetermined space may be formed between the rib structure 244*p* and the opening T1 of the partition wall portion 242 so that a refrigerant may circulate.

Meanwhile, when high heat gas is generated in at least some of the plurality of cell assemblies 100 due to fire or thermal runaway, the opening and closing portion 244B may be configured to cause volume expansion by the high heat gas to seal the opening T1. For example, as shown in FIGS. 10 and 11, the opening and closing portion 244B may make the rib structure 244*p* receive heat by the high heat gas and cause volume expansion to seal a predetermined space in which the refrigerant circulates.

Accordingly, according to this configuration of the present disclosure, the opening and closing portion 244B is configured to seal the opening T1 by causing volume expansion in at least a part thereof at more than the predetermined temperature, thereby blocking the generated high heat gas or heat from moving to the other cell assemblies 100. Accordingly, it is possible to effectively prevent fire or thermal runaway from spreading to the other cell assemblies 100 of the battery module 200. Accordingly, it is possible to increase the safety of the battery module 200.

Figure 12:
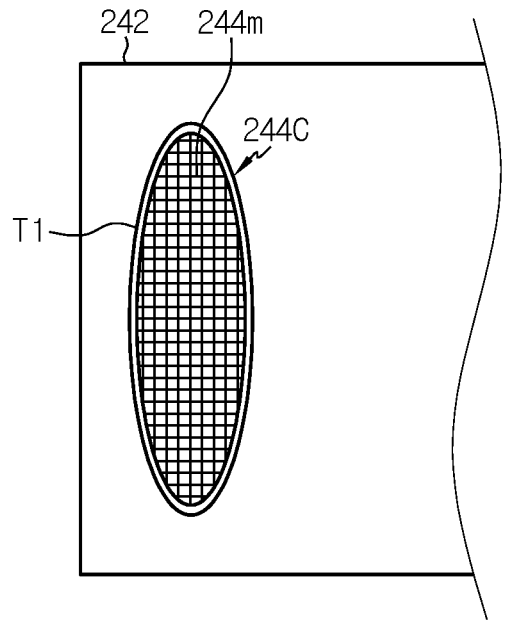
FIGS. 12 and 13 are partial perspective views schematically showing an operation of a blocking member, which is a partial configuration of a battery module according to another embodiment of the present disclosure.
Figure 13:
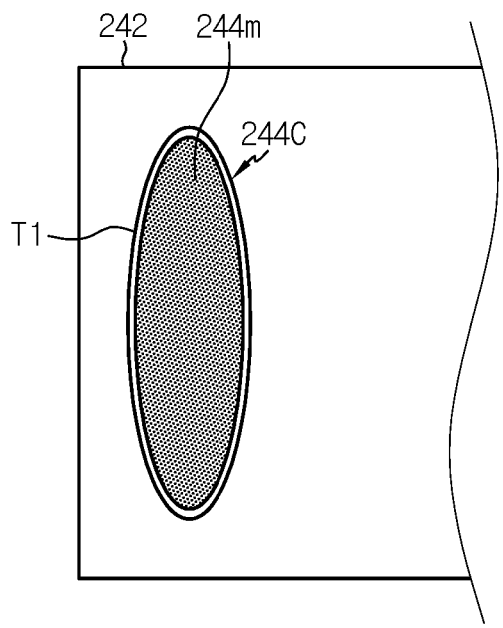

FIGS. 12 and 13 are partial perspective views schematically showing an operation of a blocking member, which is a partial configuration of the battery module according to another embodiment of the present disclosure.

Referring to FIGS. 12 and 13, an opening and closing portion 244C may have a mesh structure 244*m*. The mesh structure 244*m* may be configured to cause volume expansion in at least a part thereof at more than the predetermined temperature such that a mesh hole is sealed. That is, in the mesh structure 244*m* of the opening and closing portion 244C, the refrigerant (the air A1) may circulate through the mesh hole in a state in which no fire or thermal runaway occurs. Meanwhile, when fire or thermal runaway occurs in some of the plurality of cell assemblies 100, a string of the mesh structure 244*m* may be configured to cause volume expansion due to high heat gas such that the mesh hole is filled.

For example, as shown in FIGS. 12 and 13, the opening and closing portion 244C having the mesh structure 244*m* may be inserted into the opening T1 formed in the partition wall portion 242 of the blocking member 240. In normal times, the refrigerant may circulate through the mesh hole of the mesh structure 244*m*. Meanwhile, when a gas or flame of high heat is ejected from the cell assembly 100, the mesh structure 244*m* may cause volume expansion, thereby clogging the mesh hole.

Accordingly, according to this configuration of the present disclosure, the opening and closing portion 244C includes the mesh structure 244*m* configured to cause volume expansion in at least a part thereof at more than the predetermined temperature such that the mesh hole is sealed, thereby preventing the generated high heat gas or heat from moving to the other cell assemblies 100. Accordingly, it is possible to effectively prevent fire or thermal runaway from spreading to the other cell assemblies 100 of the battery module 200. Accordingly, it is possible to increase the safety of the battery module 200.

Figure 14:
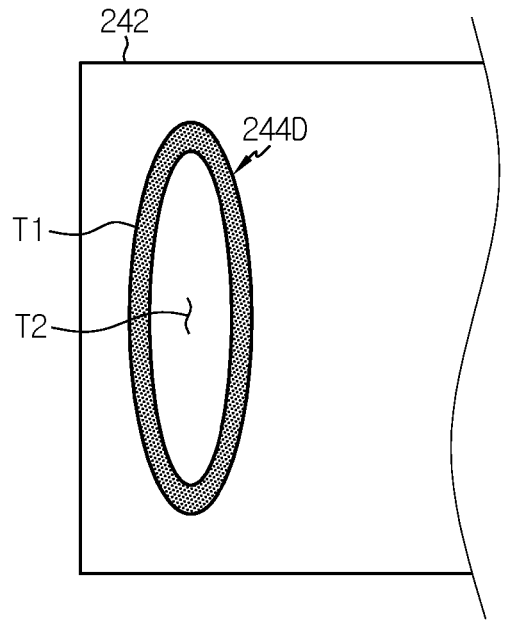
FIG. 14 is a partial perspective view schematically showing a blocking member, which is a partial configuration of a battery module according to another embodiment of the present disclosure.

FIG. 14 is a partial perspective view schematically showing a blocking member, which is a partial configuration of the battery module according to another embodiment of the present disclosure.

Referring to FIG. 14, according to another embodiment, an opening and closing portion 244D may be inserted into and positioned in the opening T1 and have a ring shape with the perforated center. The opening and closing portion 244D of the ring shape may be configured to be in close contact with an inner surface of the opening T1. The opening and closing portion 244D may be configured to cause volume expansion at more than a predetermined temperature to seal a hole T2 perforated in the center.

For example, as shown in FIG. 14, the opening T1 perforated in the front and rear direction may be formed in the left side of the partition wall portion 242. The opening and closing portion 244D having the ring shape with the perforated center may be inserted into and provided in the opening T1. The opening and closing portion 244D may be configured to seal a hole T2 of a perforated ring shape when the temperature rises to more than a predetermined temperature.

Accordingly, according to this configuration of the present disclosure, the opening and closing portion 244D is inserted into and positioned in the opening T1 and have the ring shape with the perforated center, thereby blocking the generated high heat gas or heat from moving to the other cell assemblies 100. Accordingly, it is possible to effectively prevent fire or thermal runaway from spreading to the other cell assemblies 100 of the battery module 200. Accordingly, it is possible to increase the safety of the battery module 200.

Figure 15:
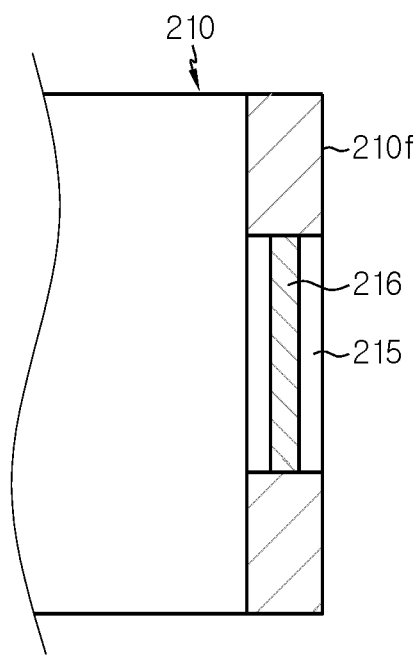
FIG. 15 is a partial side view schematically showing a battery module taken along line 15-15 of FIG. 1.

FIG. 15 is a partial side view schematically showing the battery module taken along line 15-15 of FIG. 1.

Referring to FIG. 15 together with FIG. 1, an opening portion 215 that is opened through which the inside and the outside may circulate may be formed in a part of the module housing 210. The opening portion 215 of the outer wall (right side wall) 210*f* of the module housing 210 may include a vent portion 216 configured to open to the outside when the internal temperature rises to more than a predetermined temperature. That is, at least a part of the vent portion 216 may be configured such that at least a part of the body is melted and lost so that the internal gas is discharged to the outside. For example, the vent portion 216 may include low density polyethylene (LDPE), high density polyethylene (HDPE), polymethyl methacrylate (PMMA), or the like.

The vent portion 216 may be formed adjacent to the blocking member 240. That is, when high heat gas flowing to the refrigerant passage 211 is blocked by the blocking member 240, the stagnant high heat gas may be discharged through the vent portion 216.

Therefore, according to this configuration of the present disclosure, a part of the outer wall 210*f* of the module housing 210 includes the vent portion 216 configured to be opened by melting at least a part of the body when the internal temperature rises to more than a predetermined temperature, such that, when the high heat gas flowing from the refrigerant passage 211 is blocked by the blocking member 240, the high heat gas stagnated by the blocking member 240 may be discharged through the vent portion 216, thereby minimizing the spread of heat to the other cell assemblies 100, and the high heat gas may be discharged in the intended direction, and thus safer handling is possible.

Figure 16:
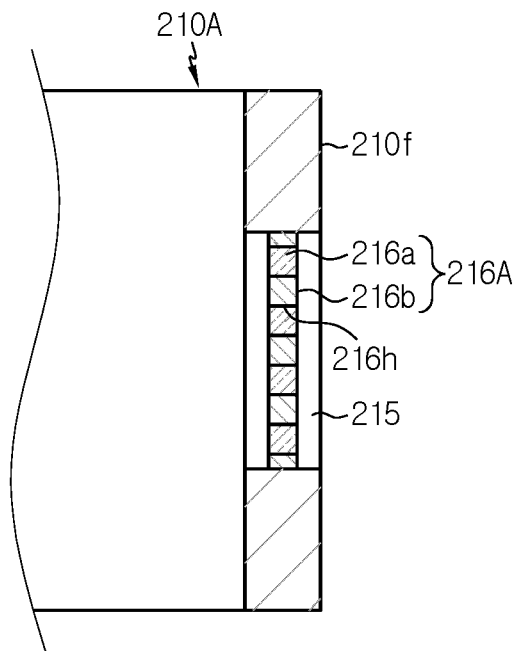
FIG. 16 is a partial side view schematically showing a battery module according to another embodiment of the present disclosure.

FIG. 16 is a partial side view schematically showing a battery module according to another embodiment of the present disclosure.

Referring to FIG. 16, the opening portion 215 that is opened through which the inside and the outside may circulate may be formed in a part of the module housing 210A. A vent portion 216A may be located in the opening portion 215. The vent portion 216A of FIG. 16 may further include a heat transfer member 216*b* as compared to the vent portion 216 of FIG. 15. A receiving hole 216*h* into which a material 216*a* melted at more than a predetermined temperature is inserted may be formed in the heat transfer member 216*b*. The heat transfer member 216*b* may be configured for high heat gas to transfer heat to the material 216*a* inserted into the receiving hole 216*h* and melted at more than a predetermined temperature. For example, the heat transfer member 216*b* may be an aluminum alloy having excellent thermal conductivity.

For example, as shown in FIG. 16, the opening portion 215 through which the inside and the outside may circulate may be formed in a part of the module housing 210A, and the heat transfer member 216*b* configured to seal the opening portion 215 may be provided in the opening portion 215. A plurality of receiving holes 216*h* into which the material 216*a* melted at 100 degrees Celsius or higher is inserted may be formed in the heat transfer member 216*b*. The receiving hole 216*h* may be filled with a low density polyethylene material 216*a*.

Accordingly, according to this configuration of the present disclosure, the heat transfer member 216*b* is further provided, and the receiving hole 216*h* into which the material 216*a* melted at more than a predetermined temperature is inserted is formed in the heat transfer member 216*b*, and thus heat may be quickly transferred to the heat transfer member 216*b* by the high heat gas generated from the cell assembly 100, and the material 216*a* melted at more than a predetermined temperature and provided in the receiving hole 216*h* is melted by the transferred heat, such that the internal gas may be vented to the outside. That is, the vent portion 216A according to another embodiment may shorten the melting time of the vent portion 216A through the heat transfer member 216*b*. Accordingly, it is possible to effectively reduce the discharge time of the high heat gas generated from the cell assembly 100.

Figure 17:
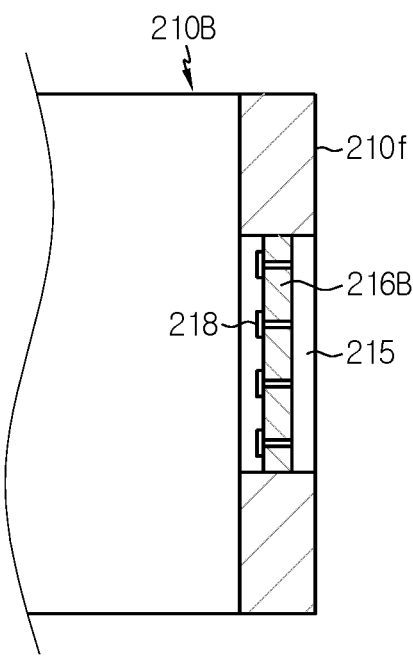
FIG. 17 is a partial side view schematically showing a battery module according to another embodiment of the present disclosure.

FIG. 17 is a partial side view schematically showing a battery module according to another embodiment of the present disclosure.

Referring to FIG. 17, when compared to the vent portion 216 of FIG. 15, a vent portion 216B of a module housing 210B according to another embodiment of FIG. 17 may further include a heat transfer pin 218 configured to heat at least a part of the body. The heat transfer fin 218 may be an aluminum alloy having excellent thermal conductivity. The heat transfer fin 218 may be partially inserted into the body of the vent portion 216B so that heat is effectively transferred to a material melted at more than a predetermined temperature of the vent portion 216B. A head of the heat transfer fin 218 may have a T-shape so that a contact area with high heat gas may be large.

For example, as shown in FIG. 17, the opening portion 215 through which the inside and the outside may circulate may be formed in a part of the module housing 210B, and a vent portion 216B configured to seal 215 may be provided in the opening portion 215. The vent portion 216B may include a material melted at 100 degrees Celsius or higher. Four heat transfer fins 218 may be spaced apart from each other at predetermined intervals and inserted into the body of the vent portion 216B.

Therefore, according to this configuration of the present disclosure, heat may be quickly transferred to the heat transfer fins 218 by the high heat gas generated from the cell assembly 100, and the material melted at more than a predetermined temperature of the vent portion 210B is melted by the transferred heat, such that the internal gas may be vented to the outside. That is, the vent portion 216B according to another embodiment may shorten the melting time of the vent portion 216B through the heat transfer fins 218. Accordingly, it is possible to effectively reduce the discharge time of the high heat gas generated from the cell assembly 100.

Figure 18:
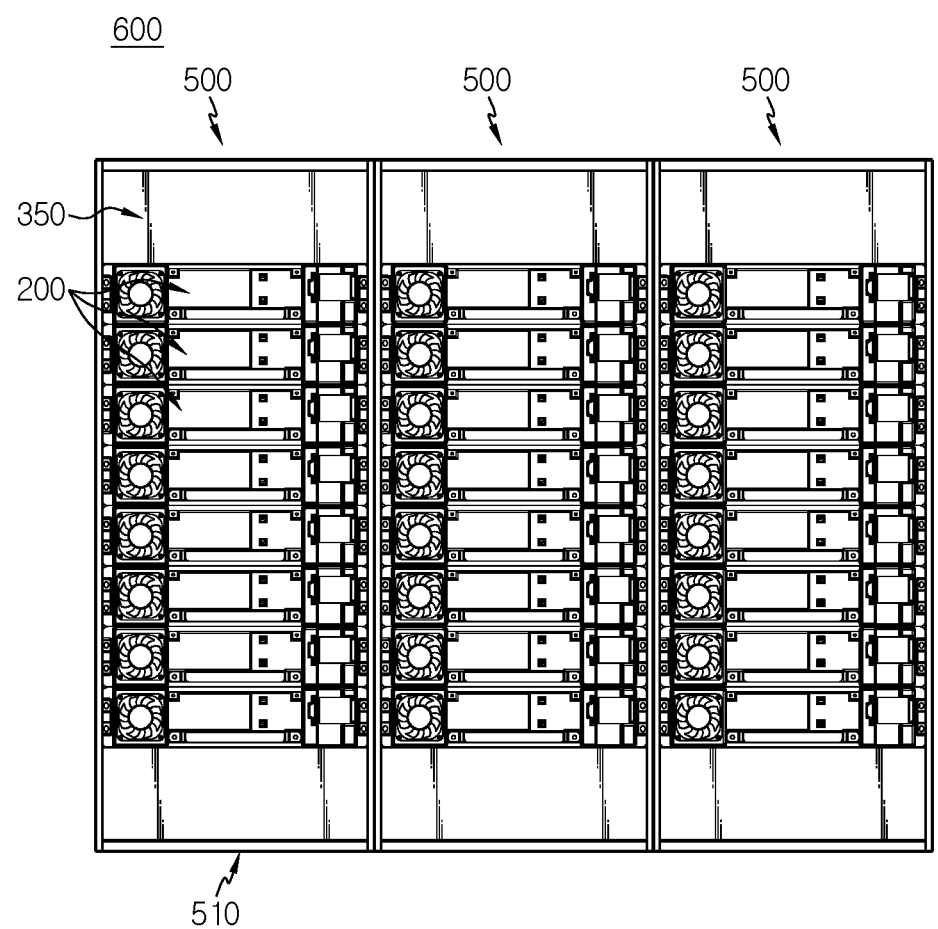
FIG. 18 is a front view schematically illustrating an energy storage device according to an embodiment of the present disclosure.

FIG. 18 is a front view schematically illustrating an energy storage device according to an embodiment of the present disclosure.

Referring to FIG. 18, a battery rack 500 according to an embodiment of the present disclosure may include at least one battery module 200, and a rack case 510 accommodating the battery module 200. The rack case 510 may also be configured to accommodate a plurality of battery modules 200 that are stacked in a vertical direction. Inside the rack case 510, a lower surface of the battery module 200 may be mounted in parallel to a horizontal surface.

Here, the horizontal direction may mean a direction parallel to the ground when the battery module 200 is placed on the ground, and may also be at least one direction on a plane perpendicular to the vertical direction.

Moreover, the rack case 510 is configured to have at least one side openable, so that the battery module 200 may be introduced into the inner space through the open side. However, the rack case 510 may be configured such that such an open side is closable.

In addition, the battery rack 500 may further include other components such as a battery management system (BMS) 350 inside or outside the rack case 510.

Referring back to FIG. 18, an energy storage device 600 according to an embodiment of the present disclosure may include at least two battery racks 500. The two or more battery racks 500 may be arranged in one direction. For example, as shown in FIG. 18, the energy storage device 600 may be configured such that three battery racks 500 are arranged in one direction.

Meanwhile, in the present specification, although the terms indicating directions such as up, down, left, right, front, and back are used, it is apparent to those skilled in the art that these terms are for convenience of explanation only and vary depending on the position of a target object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

[Description of Reference Numerals]

| | |
|---|---|
| 200: battery module | 100: cell assembly |
| 110: secondary battery | 210: module housing |
| 240: blocking member | 242, 244: partition wall portion, opening and closing portion |
| 244a: extension structure | 244b: stopper structure |
| 244b2: bent shape | |
| 244m: mesh structure | T1, T2: opening, hole |
| 211: refrigerant passage | 212, 213: outlet, inlet |
| 211a, 211b: supply portion, discharge portion | |
| 216: vent portion | 218: heat transfer fin |
| 500: battery rack | 350: control unit |
| 510: rack case | 600: energy storage device |

INDUSTRIAL APPLICABILITY

The present disclosure relates to a battery module. Further, the present disclosure is applicable to an industry related to a battery rack including the battery module or a large scale energy storage device.

What is claimed is:

1. A battery module comprising: a plurality of cell assemblies; a module housing comprising an accommodation space configured to accommodate the plurality of cell assemblies a partition wall portion positioned between the plurality of cell assemblies and having an opening; and an opening and closing portion configured to move linearly so as to block at least a part of the opening, wherein the opening and closing portion comprises: an extension structure located in the opening and extending in a first to be movable in the first direction; and a stopper structure formed on each end of the extension structure and configured to block at least a part of the opening when moving in the first direction.

2. The battery module of claim 1, wherein the module housing comprises a refrigerant passage configured to make a refrigerant introduced from an outside move in the accommodation space, and
wherein the partition wall portion is positioned in the refrigerant passage.

3. The battery module of claim 1, wherein at least a part of an edge of the stopper structure is bent in the first direction.

4. The battery module of claim 1, wherein a first part of the partition wall portion is interposed between the plurality of cell assemblies, and at least a part of a second part protrudes beyond the plurality of cell assemblies.

5. The battery module of claim 1, wherein a part of an outer wall of the module housing comprises a vent configured to be opened by melting when an internal temperature rises to more than a second predetermined temperature.

6. The battery module of claim 5, wherein the vent comprises a heat transfer fin configured to heat the vent.

7. A battery rack comprising at least one battery module according to claim 1 and a rack case accommodating the battery module.

8. An energy storage device comprising at least two battery racks according to claim 7.

9. The battery module of claim 1, wherein the opening and closing portion has a central portion and a stopper structure at opposite ends of the central portion.

* * * * *